United States Patent
Steen

(10) Patent No.: US 6,869,377 B2
(45) Date of Patent: Mar. 22, 2005

(54) MOTOR VEHICLE GEARBOX

(75) Inventor: Marcus Steen, Angeréd (SE)

(73) Assignee: Volvo Lastvagnar AB, Gothenburg (SE)

( * ) Notice: Subject to any disclaimer, the term of this patent is extended or adjusted under 35 U.S.C. 154(b) by 0 days.

(21) Appl. No.: 10/296,983

(22) PCT Filed: May 30, 2001

(86) PCT No.: PCT/SE01/01211

§ 371 (c)(1),
(2), (4) Date: Jul. 28, 2003

(87) PCT Pub. No.: WO01/92049

PCT Pub. Date: Dec. 6, 2001

(65) Prior Publication Data

US 2004/0092364 A1 May 13, 2004

(30) Foreign Application Priority Data

May 30, 2000 (SE) .................................... 0002013

(51) Int. Cl.[7] ............................................. F16H 47/04
(52) U.S. Cl. ....................................................... 475/81

(58) Field of Search ...................................... 477/81, 80

(56) References Cited

U.S. PATENT DOCUMENTS 4,294,341 A * 10/1981 Swart ........................... 477/78
5,595,551 A    1/1997 Hedstrom et al.
5,875,410 A *  2/1999 Fowler et al. ................. 701/64
6,151,978 A * 11/2000 Huber ....................... 74/336 R

FOREIGN PATENT DOCUMENTS

| WO | 98/50247 | 11/1998 |
| WO | 99/02360 | 1/1999 |
| WO | 00/03163 | 1/2000 |

* cited by examiner

Primary Examiner—Dirk Wright
(74) Attorney, Agent, or Firm—Young & Thompson

(57) ABSTRACT

Automated multi-stage gearbox, includes a basic gearbox with a number of gears and a two-stage split gearing coupled in front of and in series with the basic gearbox. Shifting is effected by compressed-air cylinders which are controlled by a control computer (45) which is programmed to put the split gearing in a neutral position in the event of an input signal representing zero throttle.

20 Claims, 2 Drawing Sheets

MOTOR VEHICLE GEARBOX

BACKGROUND OF THE INVENTION

The present invention relates to a multi-stage gearbox for motor vehicles, comprising an input shaft mounted rotatably in a casing, at least one intermediate shaft which is mounted in the casing and has at least one gear wheel in engagement with a gear wheel on the input shaft, a main shaft, mounted rotatably in the casing, with gear wheels which engage with gear wheels on the intermediate shaft, at least one gear wheel in each pair of mutually engaging gear wheels on the intermediate shaft and the main shaft being mounted rotatably on its shaft and lockable on its shaft by engaging means, and also operating means which interact with the engaging means and are controlled by a control unit depending on signals fed into the control unit representing various engine and vehicle data which comprise at least engine speed, vehicle speed and throttle pedal position.

DESCRIPTION OF THE RELATED ART

Automatic gearboxes of this type, what are known as automated multi-stage gearboxes, have become increasingly common in heavy-duty vehicles as microcomputer technology has developed further and made it possible to use a control computer and a number of actuators, for example servo motors, to precision-regulate engine speed, engagement and disengagement of a disk clutch between the engine and the gearbox and also the engaging means of the gearbox in relation to one another, so that soft shifting is always obtained at the correct engine speed. The advantage of this type of automatic gearbox compared with a conventional automatic gearbox constructed with planetary gear stages and with a hydrodynamic torque converter on the input side is, especially as far as use in heavy-duty vehicles is concerned, that on the one hand it is simpler and more robust and can be produced at a considerably lower cost than the conventional automatic gearbox, and on the other hand it has greater efficiency, which means that lower fuel consumption is possible.

The automatic gearbox constructed from planetary gears usually has one-way engaging means between the planetary gear stages, which, when the engine is driving in the automatic transmission position, lock for torque transmission from the engine to the driving wheels but, when torque transmission takes place in the opposite direction, that is to say with zero throttle and the vehicle in motion, disengage and allow the vehicle to roll freely without engine braking, which results in lower fuel consumption by utilizing the motive energy of the vehicle than if the engine remains engaged and brakes. It has previously been possible to achieve the corresponding freewheel function in previously known automated multi-stage gearboxes only by manual disengagement of the disk clutch between the engine and the gearbox.

SUMMARY OF THE INVENTION

The object of the present invention is to produce an automated multi-stage gearbox of the type indicated in the introduction, which is made in such a manner that an automatic freewheel function corresponding to that in the conventional automatic gearbox with planetary gear stages and overrunning clutches can be obtained.

According to the invention, this is achieved by virtue of the fact that the control unit is arranged so as, in. the event of input signals representing zero throttle, to give an output signal to put a currently engaged synchronized gear in the neutral position, and so as, when the throttle is subsequently opened (i.e., a positive throttle value), to give the operating means a signal to engage the synchronized gear when the engine has reached a speed suitable for the synchronizing procedure.

By virtue of putting a synchronized gear in its neutral position, the drive line is uncoupled, so that the vehicle can roll freely without the braking effect which is otherwise obtained through friction losses in the engine. In this way, a freewheel function is therefore obtained without the use of special overrunning clutches.

In a preferred embodiment of the gearbox according to the invention, use is made, for the freewheel function, of a synchronized split gearing which is coupled in front of and in series with a basic gearbox and has at least two rotatably mounted gear wheels which are simultaneously disengageable and alternatively lockable relative to the input shaft by engaging and synchronizing means controlled by said operating means and each engage with a gear wheel on the intermediate shaft. In this connection, the control unit is arranged so as, in the event of input signals representing zero throttle and engine brale switched off, to disengage the gear wheel currently locked relative to the input shaft by putting said engaging and synchronizing means in the neutral position. By utilizing a synchronized split gearing for the freewheel function, use can be made of an unsynchronized basic gearbox, which further simplifies, and reduces the cost of, the gearbox as a whole.

In a development of the gearbox according to the invention, in order to prevent a possible engine stoppage at the same time as the freewheel function is activated resulting in various servos, for example the steering servo and the brake servo, ceasing to function by virtue of the fact that the servo pumps stop simultaneously with the engine, the input shaft is connected to an automated disk clutch controlled by the control unit, the control unit being arranged so as—on receiving input signals representing zero engine speed and a given vehicle speed at the same time as said synchronized gear is disengaged—to give a signal first to disengage the disk clutch, then to engage the synchronized gear and lastly to engage the disk clutch. When the disk clutch couples the gearbox to the engine, the engine and servo pumps coupled thereto are driven by the vehicle, so that the servo functions are maintained.

BRIEF DESCRIPTION OF THE DRAWINGS

The invention is described in greater detail with reference to illustrative embodiments shown in the accompanying drawings, in which.

DESCRIPTION OF THE PREFERRED EMBODIMENTS

Figure 1:
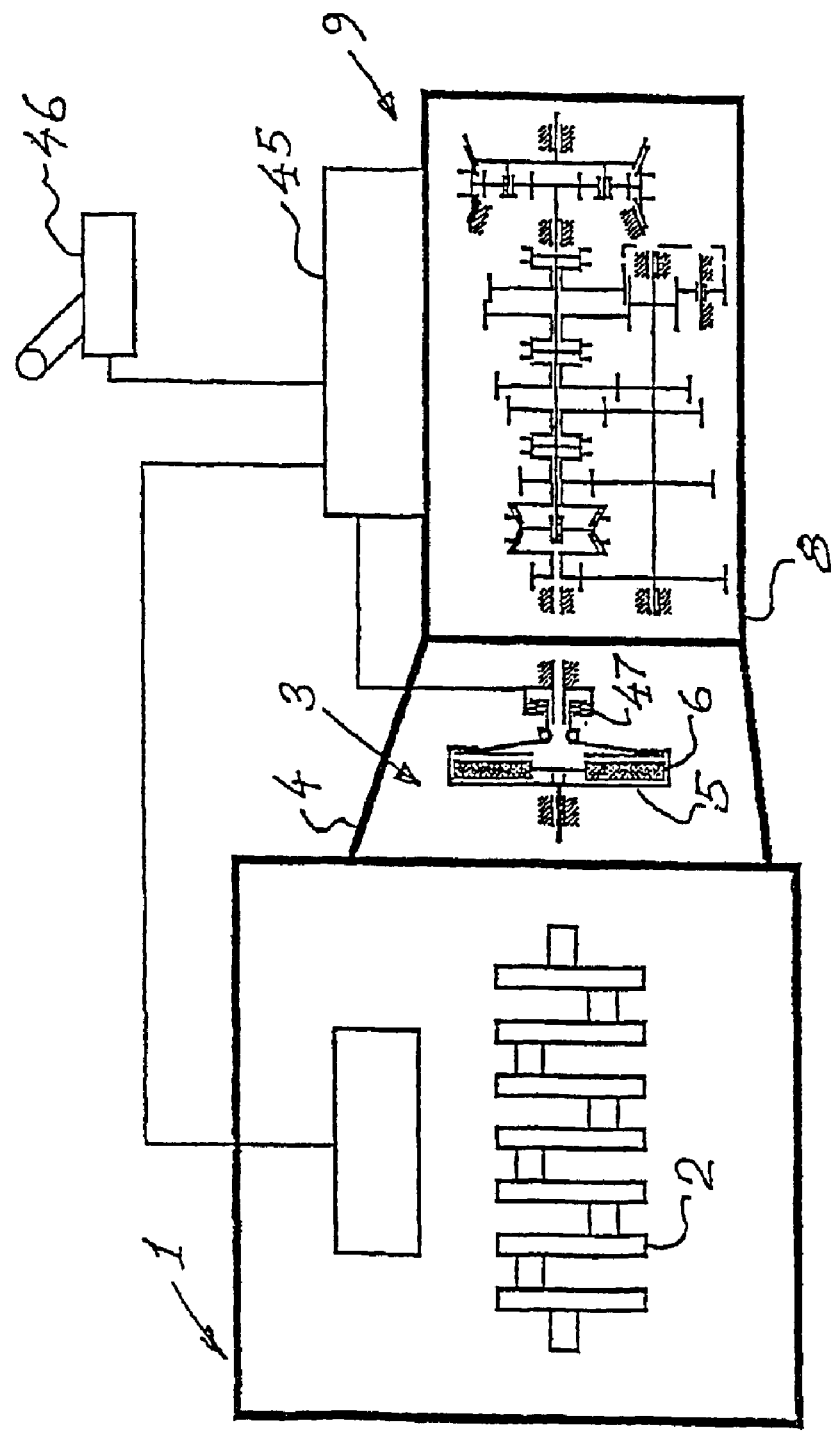
FIG. 1 shows a diagrammatic representation of an internal combustion engine with an adjoining clutch and gearbox.

In FIG. 1, reference number 1 designates a six-cylinder internal combustion engine, for example a diesel engine, the crankshaft 2 of which is coupled to a single-plate dry disk clutch which is designated generally by reference number 3 and is enclosed in a clutch case 4. The crankshaft 2 is connected non-rotatably to the clutch housing 5 of the clutch 3, while its disk plate 6 is connected non-rotatably to an input shaft 7 which is mounted rotatably in the casing 8 of a gearbox designated generally by reference number 9. A main shaft 10 and an intermediate shaft 11 are also mounted rotatably in the casing 8.

Figure 2:
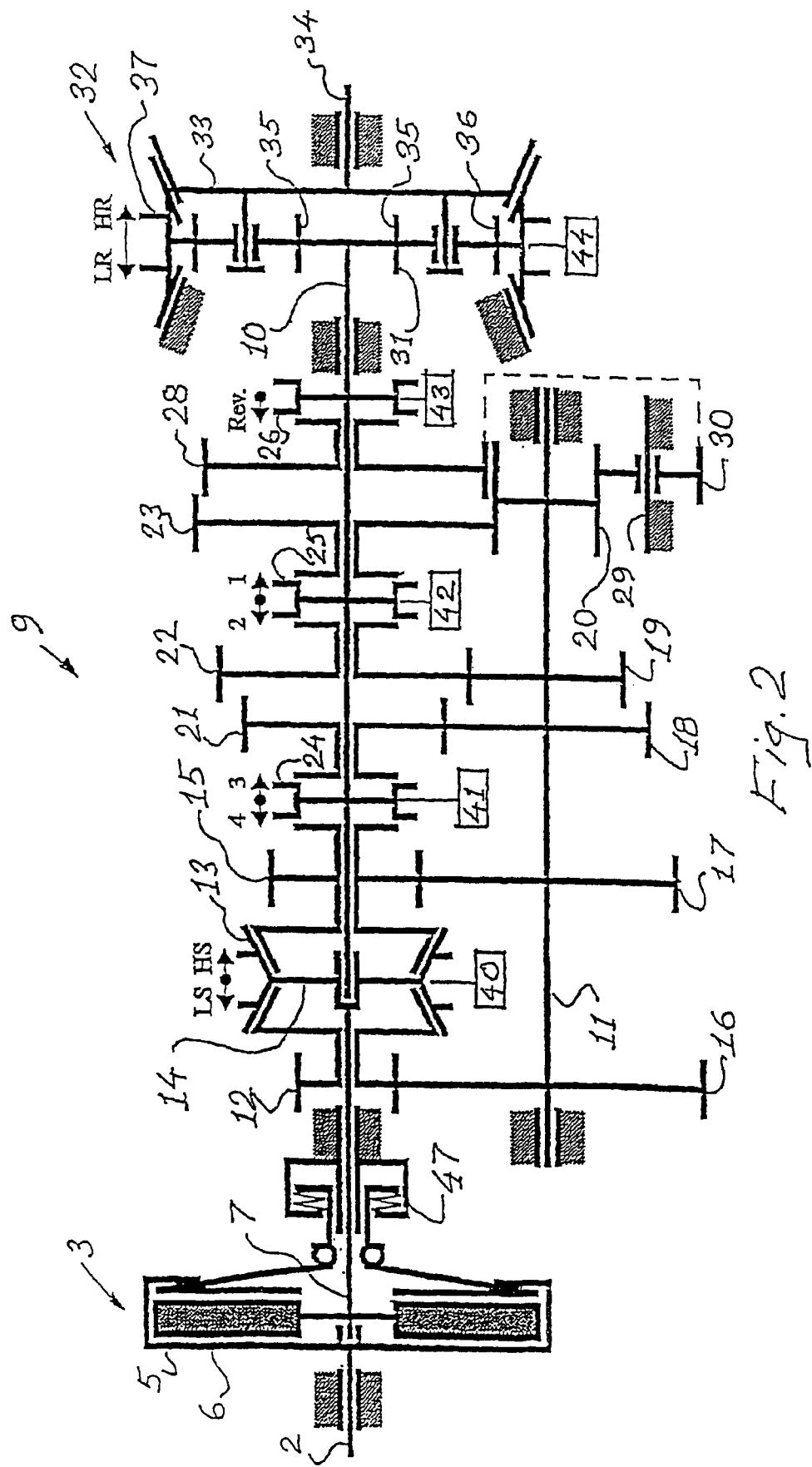
FIG. 2 shows the clutch and the gearbox in FIG. 1 on enlarged scale.

As can be seen most clearly from FIG. 2, a gear wheel 12 is mounted rotatably on the input shaft 7 and is lockable on the shaft by means of an engaging sleeve 13 which is provided with synchronizing means and is mounted non-rotatably but axially displaceably on a hub 14 connected non-rotatably to the input shaft 7. By means of the engaging sleeve 13, a gear wheel 15 mounted rotatably on the main shaft 10 is also lockable relative to the input shaft 7. With the engaging sleeve 13 in a central position, both gear wheels 12 and 15 are disengaged from their shafts 7 and, respectively, 10. The gear wheels 12 and 15 engage with gear wheels 16 and, respectively, 17 which are connected non-rotatably to the intermediate shaft 11. Arranged in a rotationally fixed manner on the intermediate shaft 11 are further gear wheels 18, 19 and 20 which engage with gear wheels 21, 22 and, respectively, 23 which are mounted rotatably on the main shaft 10 and are lockable on the main shaft by means of engaging sleeves 24 and, respectively, 25 which, in the illustrative embodiment shown, do not have synchronizing arrangements. A further gear wheel 28 is mounted rotatably on the main shaft 10 and engages with an intermediate gear wheel 30 which is mounted rotatably on a separate shaft 29 and engages in turn with the intermediate shaft gear wheel 20. The gear wheel 28 is lockable on its shaft by means of an engaging sleeve 26.

The gear wheel pairs 12, 16 and 15, 17 and also the engaging sleeve 13 form a split gearing with a low gear stage LS and a high gear stage HS. The gear wheel pair 15, 17 also forms, together with the gear wheel pairs 21, 18, 22, 19, 23, 20 and 28, 30, a basic gearbox with four forward gears and one reverse gear. Arranged in a rotationally fixed manner on the output end of the main shaft is a gear wheel 31 which forms the sun gear in a two-stage range gear of the planetary type designated by reference number 32, the planet wheel carrier 33 of which is connected in a rotationally fixed manner to a shaft 34 which forms the output shaft of the gearbox. The planet wheels 35 of the range gear 32 engage with a ring gear 36 which, by means of an engaging sleeve 37, is lockable relative to the gearbox casing 8 for low range LR and relative to the planet wheel carrier 33 for high range HR. The engaging sleeves 13, 24, 25, 26 and 37 are displaceable as shown by the arrows in FIG. 2, the gear stages shown next to the arrows being obtained. The displacement is brought about by servo devices 40, 41, 42, 43 and 44 which are indicated diagrammatically in FIG. 2 and may be pneumatically operated piston/cylinder arrangements of the type used in a gearbox of the type described above, which is marketed under the name Geartronic®.

The servo devices 40, 41, 42, 43 and 44 are controlled by an electronic control unit 45 (FIG. 1), comprising a microcomputer, depending on signals fed into the control unit representing the various engine and vehicle data which comprise at least engine speed, vehicle speed, throttle pedal position and, in this case, engine brake on/off, when an electronic gear selector 46 coupled to the control unit 45 is in its automatic transmission position. When the selector is in the position for manual shifting, shifting is effected via the gear selector 46 at the command of the driver. The control unit 45 also controls fuel injection, that is to say the engine speed, depending on the throttle pedal position, and also the air supply to a pneumatic piston/cylinder arrangement 47, by means of which the clutch 3 is disengaged.

According to the invention, the control unit 45 is programmed so that the freewheel function is activated when the driver or the cruise control no longer requests either any fuel (i.e., a zero throttle value) or activation of any engine brake, for example an exhaust gas pressure regulator or a compression brake. This is effected by the control unit 45 first controlling the engine speed, so that no torque is transmitted between the input shaft 7 and the main shaft 10 of the gearbox. The control unit 45 then gives a signal to the servo device 40 to put the engaging sleeve 13 in neutral position, after which the engine is controlled to idling speed. The drive line is then uncoupled, and the vehicle can roll freely. By disengaging a synchronized split gearing, the freewheel function is obtained by disengaging one and the same gear irrespective of which gear is engaged in the basic gearbox.

The control unit 45 is programmed to deactivate the freewheel function when the driver requests fuel with the throttle pedal or the cruise control or requests engine braking by, for example, activating an exhaust gas brake or compression brake. In this connection, the control unit first regulates the engine speed in toward a speed which makes synchronization possible, and then the engaging sleeve 13 is displaced into its previous engagement position. The drive line is then coupled together, and driving or engine braking is possible again.

Also programmed into the control unit 45 is a safety function in the event that the engine should stop when the freewheel function is activated, which involves the control unit 45 then giving a signal first to disengage the clutch 3 between the engine and the gearbox, and then to displace the engaging sleeve 13 located in the neutral position into its previous engagement position. After engagement of the synchronized gear, the control unit 45 gives a signal to reengage the clutch 3. When the clutch 3 is engaged, the engine is driven by the vehicle and any auxiliary sets, such as servo pumps and engine brakes, normally driven by the engine are then driven by the vehicle via the engine.

The invention has been described above with reference to a preferred embodiment, in which the freewheel function is achieved by disengaging one and the same gear, namely a synchronized split gearing, irrespective of which gear is engaged when free-rolling of the vehicle is desired. Within the scope of the invention, it is of course possible to conceive of disengaging the currently engaged synchronized gear in a synchronized gearbox without split gearing.

What is claimed is:

1. A multi-stage gearbox for motor vehicles, comprising an input shaft (7) mounted rotatably in a casing (8), at least one intermediate shaft (11) which is mounted in the casing and has at least one gear wheel (16, 18) in engagement with a gear wheel (12, 15) on the input shaft, a main shaft (10), mounted in the casing, with gear wheels (15, 21, 22, 23) which engage with gear wheels (18, 19, 20) on the intermediate shaft, at least one gear wheel in each pair of mutually engaging gear wheels on the intermediate shaft and the main shaft being mounted rotatably on its shaft and being lockable on its shaft by engaging means (13, 24, 25), and also operating means (40, 41, 42) which interact with the engaging means and are controlled by a control unit (45) depending on signals fed into the control unit representing various engine and vehicle data which comprise at least engine speed, vehicle speed and throttle pedal position providing a throttle value, characterized in that the control unit (45) is arranged so as, in the event of input signals representing a zero throttle value, to give an output signal to the operating means (40, 41, 42) to put a currently engaged synchronized gear in a neutral position, and so as, when a positive throttle value is subsequently received, to give the operating means a signal to engage the synchronized gear when the engine has reached a speed suitable for a synchronizing procedure.

2. Gearbox as claimed in claim 1, coupled to an engine with engine braking means in order to increase a braking effect of the engine, characterized in that the control unit (45) is arranged so as, in the event of input signals representing the zero throttle value and engine braking means switched off, to give an output signal to the operating means (40, 41, 42) to put the currently engaged synchronized gear in the neutral position.

3. Gearbox as claimed in claim 1, characterized in that at least two rotatably mounted gear wheels (12, 15) are simultaneously disengageable and alternatively lockable relative to the input shaft by engaging and synchronizing means (13) controlled by said operating means (40) and each engage with a gear wheel (16, 17) on the intermediate shaft (11), and in that the control unit (45) is arranged so as, in the event of input signals representing the zero throttle value and engine brake switched off, to disengage the gear wheel currently locked relative to the input shaft (7) by putting said engaging and synchronizing means in a neutral position.

4. Gearbox as claimed in claim 3, characterized in that the disengageable gear wheel (21, 22, 23) in each pair of mutually engaging gear wheels on the intermediate shaft (11) and the main shaft (10) is lockable on its shaft by engaging means (24, 25) which are free of a synchronizing function.

5. Gearbox as claimed in claim 1, characterized in that the input shaft (7) is connected to an automated disk clutch (3) controlled by the control unit, and in that the control unit (45) is arranged so as—on receiving input signals representing a zero engine speed and a given vehicle speed at the same time as said synchronized gear is disengaged—to give a signal first to disengage the disk clutch, then to engage the synchronized gear and lastly to engage the disk clutch.

6. Gearbox as claimed in claim 1, characterized in that the main shaft (10) bears, in a rotationally fixed manner, a sun gear (35) in a planetary gear, a planet wheel carrier (33) of which is connected to an output shaft (34) mounted rotatably in the casing.

7. Gearbox as claimed in claim 2, characterized in that the input shaft (7) is connected to an automated disk clutch (3) controlled by the control unit, and in that the control unit (45) is arranged so as—on receiving input signals representing a zero engine speed and a given vehicle speed at the same time as said synchronized gear is disengaged—to give a signal first to disengage the disk clutch, then to engage the synchronized gear and lastly to engage the disk clutch.

8. Gearbox as claimed in claim 3, characterized in that the input shaft (7) is connected to an automated disk clutch (3) controlled by the control unit, and in that the control unit (45) is arranged so as—on receiving input signals representing a zero engine speed and a given vehicle speed at the same time as said synchronized gear is disengaged—to give a signal first to disengage the disk clutch, then to engage the synchronized gear and lastly to engage the disk clutch.

9. Gearbox as claimed in claim 4, characterized in that the input shaft (7) is connected to an automated disk clutch (3) controlled by the control unit, and in that the control unit (45) is arranged so as—on receiving input signals representing a zero engine speed and a given vehicle speed at the same time as said synchronized gear is disengaged—to give a signal first to disengage the disk clutch, then to engage the synchronized gear and lastly to engage the disk clutch.

10. Gearbox as claimed in claim 2, characterized in that the main shaft (10) bears, in a rotationally fixed manner, a sun gear (35) in a planetary gear, a planet wheel carrier (33) of which is connected to an output shaft (34) mounted rotatably in the casing.

11. Gearbox as claimed in claim 3, characterized in that the main shaft (10) bears, in a rotationally fixed manner, a sun gear (35) in a planetary gear, a planet wheel carrier (33) of which is connected to an output shaft (34) mounted rotatably in the casing.

12. Gearbox as claimed in claim 4, characterized in that the main shaft (10) bears, in a rotationally fixed manner, a sun gear (35) in a planetary gear, a planet wheel carrier (33) of which is connected to an output shaft (34) mounted rotatably in the casing.

13. Gearbox as claimed in claim 5, characterized in that the main shaft (10) bears, in a rotationally fixed manner, a sun gear (35) in a planetary gear, a planet wheel carrier (33) of which is connected to an output shaft (34) mounted rotatably in the casing.

14. A multi-stage gearbox for motor vehicles, comprising:
an input shaft (7) mounted rotatably in a casing (8);
at least one intermediate shaft (11) mounted in the casing and having at least one gear wheel (16, 18) in engagement with a gear wheel (12, 15) on the input shaft;
a main shaft (10), mounted in the casing, with gear wheels (15, 21, 22, 23) which engage with gear wheels (18, 19, 20) on the intermediate shaft,
at least one gear wheel in each pair of mutually engaging gear wheels on the intermediate shaft and the main shaft being mounted rotatably on its shaft and being lockable on its shaft by engaging means (13, 24, 25); and
operating means (40, 41, 42) which interact with the engaging means and are controlled by a control unit (45) depending on input signals fed into the control unit representing engine and vehicle data which comprise at least engine speed, vehicle speed and throttle values,
wherein, the control unit (45) is arranged so as, in the event of an input signal representing a zero throttle value, to give an output signal to the operating means (40, 41, 42) to put a currently engaged synchronized gear in a neutral position, and so as, when another input signal representing a positive throttle value is subsequently received, to give the operating means a signal to engage the synchronized gear when the engine has reached a speed suitable for a synchronizing procedure.

15. Gearbox as claimed in claim 14, coupled to an engine with engine braking means in order to increase a braking effect of the engine, characterized in that the control unit (45) is arranged so as, in the event of input signals representing the zero throttle value and engine braking means switched off, to give an output signal to the operating means (40, 41, 42) to put the currently engaged synchronized gear in the neutral position.

16. Gearbox as claimed in claim 14, characterized in that at least two rotatably mounted gear wheels (12, 15) are simultaneously disengageable and alternatively lockable relative to the input shaft by engaging and synchronizing means (13) controlled by said operating means (40) and each engage with a gear wheel (16, 17) on the intermediate shaft (11), and in that the control unit (45) is arranged so as, in the event of input signals representing the zero throttle value and engine brake switched off, to disengage the gear wheel currently locked relative to the input shaft (7) by putting said engaging and synchronizing means in a neutral position.

17. Gearbox as claimed in claim 16, characterized in that the disengageable gear wheel (21, 22, 23) in each pair of mutually engaging gear wheels on the intermediate shaft (11) and the main shaft (10) is lockable on its shaft by engaging means (24, 25) free of any synchronizing function.

18. Gearbox as claimed in claim 14, characterized in that the input shaft (7) is connected to an automated disk clutch (3) controlled by the control unit, and in that the control unit (45) is arranged so as, on receiving input signals representing a zero engine speed and a given vehicle speed at the same time as said synchronized gear is disengaged, to give a signal first to disengage the disk clutch, then to engage the synchronized gear and lastly to engage the disk clutch.

19. Gearbox as claimed in claim 14, characterized in that the main shaft (10) bears, in a rotationally fixed manner, a sun gear (35) in a planetary gear, a planet wheel carrier (33) of which is connected to an output shaft (34) mounted rotatably in the casing.

20. A multi-stage gearbox for motor vehicles, comprising:

an input shaft (7) mounted rotatably in a casing (8);

at least one intermediate shaft (11) mounted in the casing and having at least one gear wheel (16, 18) in engagement with a gear wheel (12, 15) on the input shaft;

a main shaft (10), mounted in the casing, with gear wheels (15, 21, 22, 23) which engage with gear wheels (18, 19, 20) on the intermediate shaft, at least one gear wheel in each pair of mutually engaging gear wheels on the intermediate shaft and the main shaft being mounted rotatably on its shaft and being lockable on its shaft by engaging means (13, 24, 25); and operating means (40, 41, 42) which interact with the engaging means and are controlled by a control unit (45) based on input signals fed into the control unit representing at least engine speed, vehicle speed and throttle values, wherein, the control unit (45) is arranged so as, in the event of a zero throttle value input signal, to give an output signal to the operating means (40, 41, 42) to put a currently engaged synchronized gear in a neutral position, and so as, when a positive throttle value input signal is subsequently received, to give the operating means a signal to engage the synchronized gear when the engine has reached a speed suitable for a synchronizing procedure.

* * * * *